(12) United States Patent
Marti Sala et al.

(10) Patent No.: US 7,950,517 B2
(45) Date of Patent: May 31, 2011

(54) MACHINE FOR ORIENTING AND ALIGNING ARTICLES

(76) Inventors: Jaime Marti Sala, Barcelona (ES); Alex Marti Mercadé, Sant Cugat Del Vallès (ES)

(*) Notice: Subject to any disclaimer, the term of this patent is extended or adjusted under 35 U.S.C. 154(b) by 0 days.

(21) Appl. No.: 12/467,541

(22) Filed: May 18, 2009

(65) Prior Publication Data

US 2009/0283384 A1  Nov. 19, 2009

(30) Foreign Application Priority Data

May 16, 2008  (ES) .................................. 200801418

(51) Int. Cl.
B65G 47/24 (2006.01)
(52) U.S. Cl. ........................................ 198/392; 198/396
(58) Field of Classification Search .................. 198/392, 198/396, 397.02, 397.01, 397.05
See application file for complete search history.

(56) References Cited

U.S. PATENT DOCUMENTS

| | | | | |
|---|---|---|---|---|
| 4,130,194 A | * | 12/1978 | Schindel et al. | 198/397.02 |
| 4,681,209 A | | 7/1987 | Marti | |
| 4,825,995 A | * | 5/1989 | Nalbach | 198/392 |
| 5,415,322 A | * | 5/1995 | Sala | 198/392 |
| 6,098,781 A | * | 8/2000 | Lanfranchi | 198/396 |
| 6,578,699 B2 | * | 6/2003 | Baird et al. | 198/392 |
| 7,472,782 B2 | * | 1/2009 | Corbin | 198/392 |

FOREIGN PATENT DOCUMENTS

FR  1 390 960 A  3/1965

* cited by examiner

*Primary Examiner* — James R Bidwell
(74) *Attorney, Agent, or Firm* — RatnerPrestia

(57) ABSTRACT

A rotary structure carries cavities with an upper inlet for receiving articles and an open bottom for dropping articles distributed along a closed circuit, and funnel-shaped conduits, each of which is located below a respective cavity to receive an article therefrom, a support plane for temporarily supporting the articles in the cavities and dropping them into the corresponding conduits in a site of the closed circuit, and support elements in each cavity to cooperate with parts of the article when the latter falls in order to confer to it a predetermined orientation inside the conduit. The cavities have their inlets in a perimetric ring surrounding a receptacle for the accumulation of the articles on a bottom formed by a rotating disk the peripheral edge of which reaches, upon rotating, a level above the perimetric ring.

9 Claims, 2 Drawing Sheets

MACHINE FOR ORIENTING AND ALIGNING ARTICLES

TECHNICAL FIELD

The present invention relates to a machine for orienting and aligning articles, such as empty plastic bottles or containers.

BACKGROUND OF THE INVENTION

Machines for orienting and aligning articles such as empty plastic bottles or containers are known, which machines comprise a plurality of orientation cavities associated to a rotary structure and distributed along a perimetric ring thereof, such that said orientation cavities rotate with the rotary structure in a closed circuit. The orientation cavities are provided with an upper inlet for receiving articles and with an open bottom for the passage of the articles. The rotary structure has a plurality of funnel-shaped alignment conduits, each of which is arranged below a respective orientation cavity to receive an article falling therefrom. The machines of this type include support means for temporarily supporting the articles in said orientation cavities and for dropping them into the corresponding alignment conduits in one or more predetermined sites of said closed circuit. In each of the orientation cavities there are arranged support and/or stop elements configured to cooperate with parts of the article when the latter falls through the open bottom of the orientation cavity to confer a predetermined orientation, for example, standing on its base, to the article inside the alignment conduit. The articles are generally accumulated in a disorderly manner in a space inside the perimetric ring of the rotary structure and means are provided for loading the articles from said space to the orientation cavities.

Patent FR-A-1390960 (Hoffco) discloses a machine for orienting and aligning articles of the type described above, in which the space inside the perimetric ring of the rotary structure where the orientation cavities are located and the alignment conduits define a container for the disordered articles, having a cylindrical wall rotating with a rotating structure and a stationary convex conical bottom to propel the disordered articles towards the cylindrical walls. The mentioned convex conical bottom is at a lower level than the orientation cavities. Adjacent to the rotating cylindrical wall there is a stationary helical ramp cooperating with vertical ribs projecting from the rotating cylindrical wall to raise the articles from the bottom of the container to the orientation cavities. A number of positioning machines based on the operating principle described in the mentioned patent FR-A-1390960 have subsequently appeared. However, the implementation of the rotating cylindrical wall and the stationary bottom and ramp involves a relatively complex construction that negatively affects the manufacturing cost and productive performance of the machine.

DISCLOSURE OF THE INVENTION

The present invention provides a machine for orienting and aligning articles comprising a rotary structure having associated thereto a plurality of orientation cavities distributed along a perimetric ring thereof, such that said orientation cavities are moved by the rotary structure along a closed circuit. The orientation cavities are provided with an upper inlet for receiving articles and with an open bottom for the passage of the articles. The rotary structure furthermore has a plurality of funnel-shaped alignment conduits, each of which is arranged below a respective orientation cavity to receive an article falling therefrom. The machine includes support means for temporarily supporting the articles in said orientation cavities and dropping them into the corresponding alignment conduits in at least one predetermined site of said closed circuit. In each of the orientation cavities there are arranged support and/or stop elements configured to cooperate with specific parts of the article when the latter falls through the open bottom of the orientation cavity to confer a predetermined orientation to the article inside the alignment conduit. The orientation cavities have their upper inlets arranged in an aligned manner in a perimetric ring surrounding a receptacle provided with a bottom for the accumulation of the articles. The mentioned bottom of the receptacle is formed by a rotating disk inc lined with respect to the mentioned perimetric ring, such that the rotating disk has a peripheral edge which, upon rotating, reaches an upper level slightly above said perimetric ring. This inclined rotating disk is configured to drive, upon rotating, the articles which are located in the receptacle to said upper level and transfer them on the upper inlets of the orientation cavities in the substantially horizontal ring.

A machine for orienting and aligning articles which is easy and inexpensive to construct and capable of providing highly acceptable features for medium productivity rates is achieved with this arrangement.

Preferably, the perimetric ring is substantially horizontal, the rotary structure is arranged to rotate about a vertical axis and the inclined rotating disk is arranged to rotate about an inclined axis forming an angle with respect to said vertical axis. The inclined rotating disk has a substantially planar inner region perpendicular to said inclined axis and a peripheral region adjacent to said peripheral edge having a frusto-conical configuration and forming a bevel with respect to said inner region. In an embodiment, the rotary structure and the inclined rotating disk are actuated to rotate in the same direction, although it has been found that the machine can also operate with the rotary structure and the inclined rotating disk rotating in opposite directions. An inclined perimetric ring and a rotary structure arranged to rotate about an accordingly inclined axis is also within the scope of the present invention.

In an embodiment, the inclined rotating disk has a plurality of protruding drive configurations preferably fixed to the inner region of the disk to drive the articles, although alternatively the inclined rotating disk can have an upper surface with a coefficient of friction high enough to drive the articles without needing protruding configurations. The receptacle is partially delimited by a preferably stationary side wall, although said side wall could alternatively rotate together with the rotary structure. The machine includes rejection means configured and arranged to reject those articles which are not correctly housed in the orientation cavities, returning them to the receptacle. In an embodiment, said rejection means comprise one or more stationary flexible flanges located above the orientation cavities at several points of the closed circuit. The rejection means can alternatively be formed by rotating brushes or by one or more low-pressure air jets located above the orientation cavities in the area before the unloading of the articles into the alignment conduits in a fall site.

BRIEF DESCRIPTION OF THE DRAWINGS

The previous and other features and advantages will be more fully understood from the following detailed description of an embodiment with reference to the attached drawings, in which.

DETAILED DESCRIPTION OF AN EMBODIMENT

Figure 1:
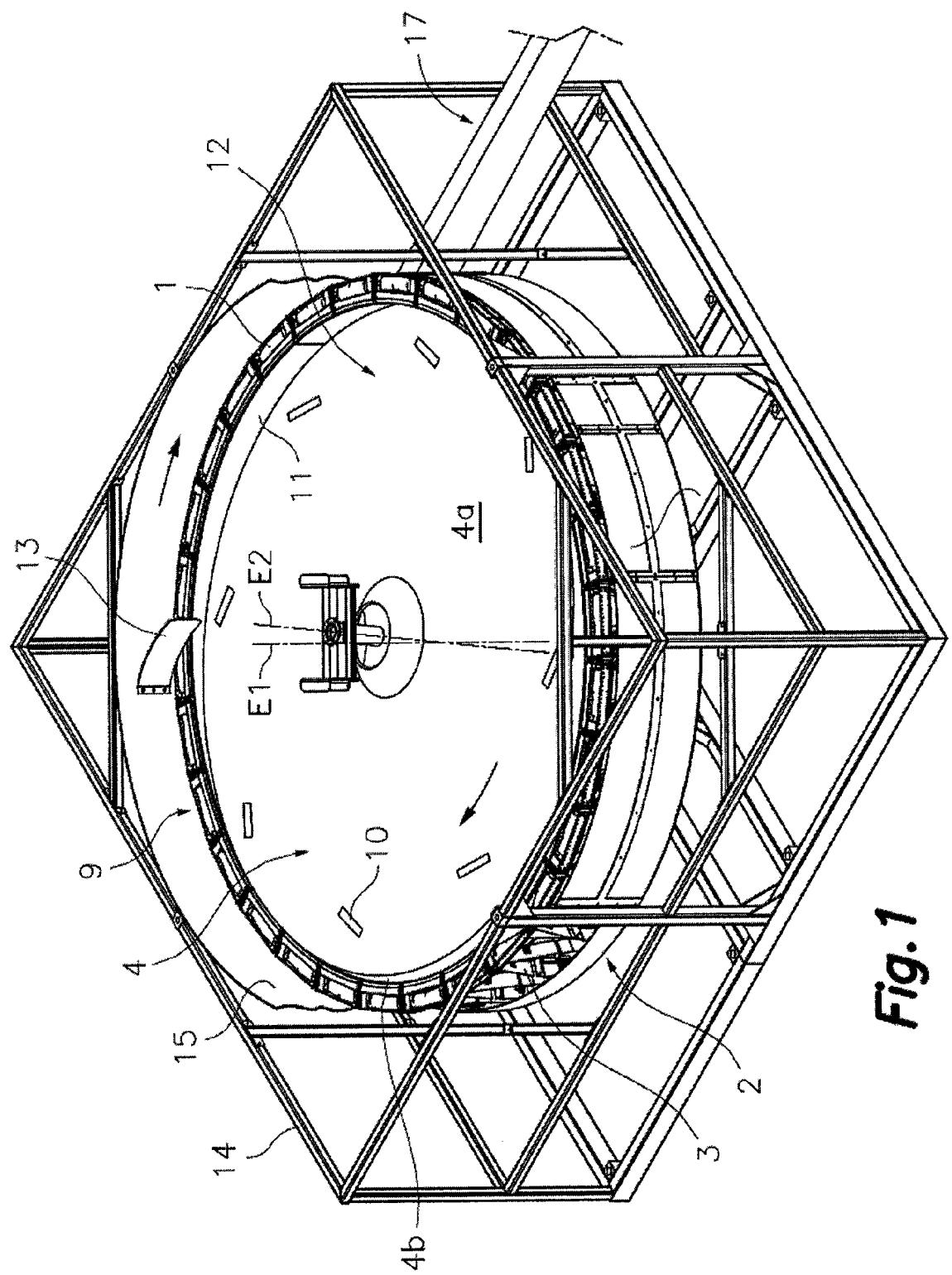
FIG. 1 is an isometric view of a machine for orienting and aligning articles according to an embodiment of the present invention, with some parts cut off or eliminated for the sake of greater clarity of the drawing.

Referring first to the Figures in general, the machine for orienting and aligning articles comprises, according to an embodiment, a frame 14 supporting a rotary structure 2 assembled such that it can rotate about a vertical axis E1. The mentioned rotary structure 2 defines a substantially horizontal perimetric ring 9 surrounding a receptacle 12 serving for the accumulation of the articles to be oriented and aligned in a disordered situation. In the rotary structure 2 there is fixed a plurality of orientation cavities 1 distributed along said perimetric ring 9 such that they are moved along a closed circuit by the rotary structure 2 upon rotating. Each of said orientation cavities 1 is sized to house only one of the articles in a lying position and in any of two opposite positions. The orientation cavities 1 have an upper inlet for receiving articles and an open bottom for the passage of the articles. The upper inlets of the orientation cavities 1 are arranged in an aligned manner in the perimetric ring 9. There is a surrounding wall 15 (FIG. 1) completely surrounding the perimetric ring 9 at the outer part of the orientation cavities 1.

Figure 2:
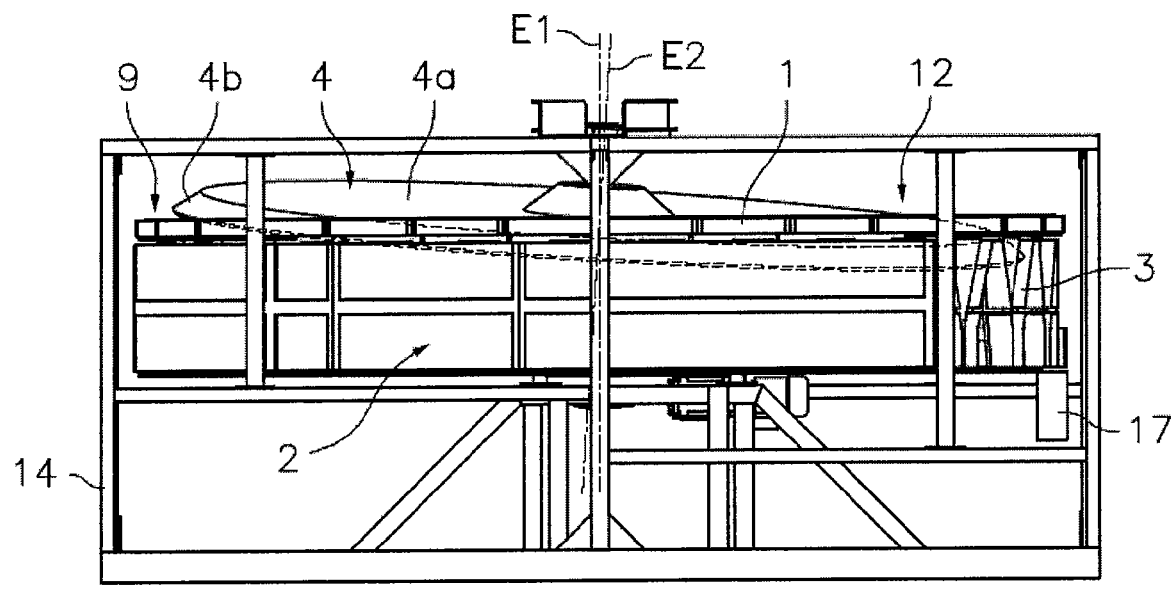
FIG. 2 is a side view of the machine of FIG. 1.

The mentioned receptacle 12 has a bottom formed by a rotating disk 4 partially housed in the receptacle 12 and arranged to rotate about an inclined axis E2 forming an angle with respect to said vertical axis E1 of rotation of the rotary structure 2. The rotating disk 4 has (see FIGS. 2 and 3) a peripheral edge which, upon rotating, reaches an upper level slightly above said substantially horizontal perimetric ring 9, and the rotating disk 4 is configured to drive, upon rotating, the articles which are located in the receptacle 12 to said upper level and drop them onto the perimetric ring 9. The rotary structure 2 and the rotating disk 4 are actuated to rotate either in the same direction or in opposite directions since, as has been verified, satisfactory results are obtained in both ways. The receptacle 12 is partially delimited by a side wall 11 (FIG. 1) rotating together with the rotary structure 2, although said side wall 11 could optionally be stationary. In the embodiment shown, the rotating disk 4 has a substantially planar inner region 4a perpendicular to said inclined axis E1 and an inclined peripheral region 4b adjacent to said peripheral edge, such that the mentioned peripheral region 4b forms a bevel with respect to said inner region 4a. On the inner region 4a of the rotating disk 4 there is arranged a plurality of protruding drive configurations 10 serving to contribute to driving the articles which are located in the receptacle 12 towards the upper level. Alternatively or additionally, the rotating disk 4 has an upper surface with a coefficient of friction high enough to contribute to driving the articles towards the upper level.

In the perimetric ring 9, some of the articles expelled by the rotating disk 4 are spontaneously introduced in the orientation cavities 1 in the lying position, either in one or the other of the two opposite positions, and the remaining articles which are left above already occupied orientation cavities 1 or which have not been introduced in the orientation cavities 1 in the lying position are rejected and returned to the receptacle 12 by rejection means. In the embodiment shown (FIG. 1), these rejection means comprise a flexible flange 13 located in a stationary position above the path of the orientation cavities 1 at a point of the closed circuit. A plurality of said flexible flanges 13 can optionally be distributed in stationary positions over all or part of the closed circuit. The flexible flanges 13 can alternatively be configured and/or arranged in a different manner to the one depicted in the drawing, or the rejection means can be formed by any of many types of rejection means known in the art of machines for orienting and aligning articles, or by any other type that can occur to a person skilled in the art. The advantage of using stationary flexible flanges 13 is that they do not need to be actuated by power sources such as compressed air or electricity, as occurs with other known rejection means. However, the use of alternative rejection means (not shown) formed by rotating brushes or by one or more low-pressure air jets located above the orientation cavities in an area before the unloading of the articles into the alignment conduits in a fall site is also contemplated within the scope of the present invention.

The rotary structure 2 supports, in addition to the orientation cavities 1, a plurality of funnel-shaped alignment conduits 3, each of which is arranged below a respective orientation cavity 1 to receive an article falling therefrom. Between the open bottoms of the orientation cavities 1 and upper inlets of the alignment conduits 3 there are arranged support means for temporarily supporting the articles in said orientation cavities 1 and dropping them into the corresponding alignment conduits 3 in at least one predetermined site of said closed circuit. In the embodiment shown, the mentioned support means are formed by a first stationary support plane 5, such that the articles which are located in the orientation cavities 1 are driven sliding on said first support plane 5 pushed by the rotation of the rotary structure 2, and said predetermined fall site is formed by a section 5a of the closed circuit where the support plane is interrupted, all of this according to the structure described in patent U.S. Pat. No. 4,681,209 to one of the inventors of this patent.

Figure 3:
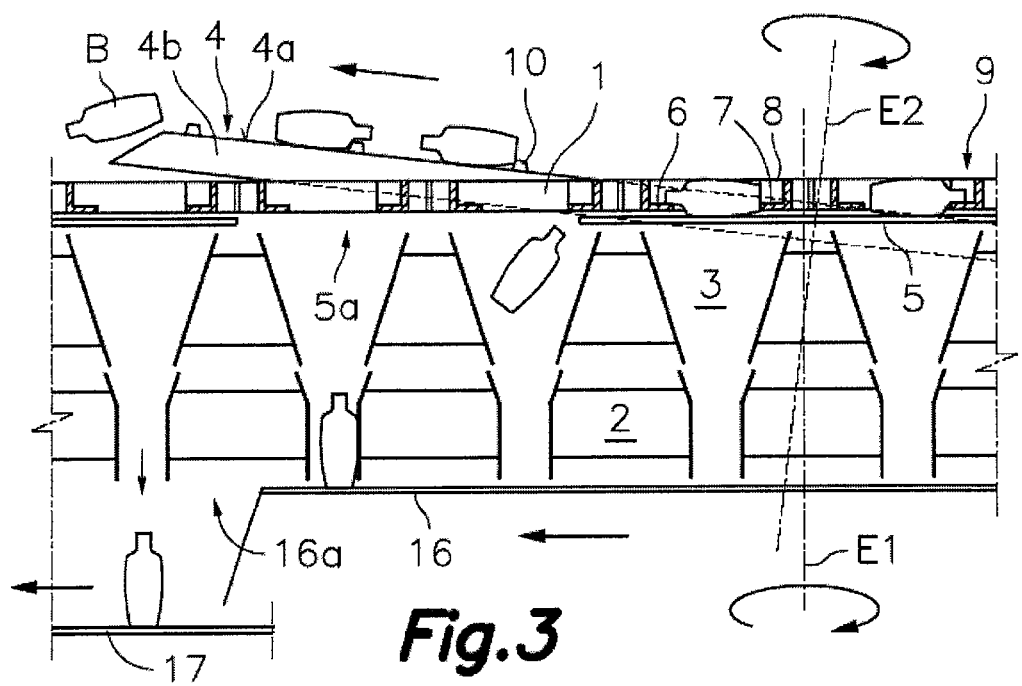
FIG. 3 is a schematic side view illustrating the operation of the machine of the present invention.

In the same way and according to what is described in said patent U.S. Pat. No. 4,681, 209, in each of the orientation cavities 1 there are arranged support and/or stop elements 6, 7, 8 configured to cooperate with parts of the article, such as a neck or a base of the article, when the latter falls through the open bottom of the orientation cavity 1 to confer a predetermined orientation to the article inside the alignment conduit 3. In FIG. 3, the articles depicted are empty plastic bottles B which are held by the neck when they fall through the open bottom of the orientation cavities 1 whichever their position therein, such that they always fall on their bases into the corresponding alignment conduits 3. Below the alignment conduits 3 there is arranged a second support plane 16 on which the oriented articles, in this case the bottles B standing on their bases, housed in the alignment conduits 3 are driven sliding and pushed by the rotation of the rotary structure 2. From the alignment conduits 3, the articles are transferred in an aligned manner to an outlet conveyor by any of the many transfer means known in the art or by other means which can occur to a person skilled in the art. For example, the second support plane 16 has an interruption 16a through which the articles fall onto a mobile surface of an outlet conveyor 17.

A person skilled in the art will be able to make modifications and variations based on the embodiment shown and described without departing from the scope of the present invention as it is defined in the attached claims.

The invention claimed is:

1. A machine for orienting and aligning articles, of the type comprising:

a plurality of orientation cavities distributed in a closed circuit and associated to a rotary structure, each orientation cavity having an inlet receiving articles and an open bottom for the passage of the articles, said rotary structure having a plurality of alignment conduits, each of which is arranged below a respective orientation cavity to receive an article falling therefrom;

support means for temporarily supporting the articles in said orientation cavities and dropping them into the corresponding alignment conduits in at least one predetermined site of said closed circuit;

support and/or stop elements in each of the orientation cavities configured to cooperate with parts of the article when the latter falls through the open bottom of the orientation cavity to confer a predetermined orientation to the article inside the alignment conduit;

a receptacle for the accumulation of the articles on a bottom, said orientation cavities having their inlets arranged in an aligned manner in a perimetric ring surrounding said receptacle; and a rotating disk housed in said receptacle forming said bottom thereof, wherein:

the rotating disk is inclined with respect to the plane of said perimetric ring;

the rotating disk has a peripheral edge which, upon rotating, reaches an upper level slightly above said perimetric ring;

the rotating disk is configured to drive, upon rotating, the articles which are located in the receptacle to said upper level and transfer them onto the perimetric ring;

the rotating disk has a substantially planar inner region perpendicular to said inclined axis and a peripheral region adjacent to said peripheral edge forming a bevel with respect to said inner region; and the perimetric ring is substantially horizontal, the rotary structure is arranged to rotate about a vertical axis, and the rotating disk is arranged to rotate about an inclined axis forming an angle with respect to said vertical axis.

2. The machine according to claim 1, wherein the rotating disk has a plurality of drive configurations to contribute to driving the articles.

3. The machine according to claim 1, wherein the rotating disk has an upper surface with a coefficient of friction high enough to contribute to driving the articles.

4. The machine according to claim 1, wherein the rotary structure and the rotating disk are actuated to rotate in the same direction.

5. The machine according to claim 1, wherein the rotary structure and the rotating disk are actuated to rotate in opposite directions.

6. The machine according to claim 1, wherein the receptacle is partially delimited by a stationary side wall.

7. The machine according to claim 1, wherein the receptacle is partially delimited by a side wall rotating together with the rotary structure.

8. The machine according to claim 1, further comprising article rejection means, configured and arranged to reject those articles which are not correctly housed in the orientation cavities, returning them to the receptacle.

9. The machine according to claim 8, wherein said rejection means comprise at least one stationary flexible flange located above the orientation cavities at a point of the closed circuit.

* * * * *